(12) United States Patent
Majd et al.

(10) Patent No.: US 11,762,757 B2
(45) Date of Patent: Sep. 19, 2023

(54) SYSTEM AND METHOD FOR MODEL-DRIVEN MULTI-CLOUD CONTACT CENTER

(71) Applicant: JPMorgan Chase Bank, N.A., New York, NY (US)

(72) Inventors: Casem Majd, Holmdel, NJ (US); Jeremy Banks, Wilmington, DE (US)

(73) Assignee: JPMORGAN CHASE BANK, N.A., New York, NY (US)

(*) Notice: Subject to any disclaimer, the term of this patent is extended or adjusted under 35 U.S.C. 154(b) by 28 days.

(21) Appl. No.: 17/450,219

(22) Filed: Oct. 7, 2021

(65) Prior Publication Data
US 2023/0116441 A1    Apr. 13, 2023

(51) Int. Cl.
G06F 9/44    (2018.01)
G06F 11/36   (2006.01)
G06F 8/60    (2018.01)
G06F 9/50    (2006.01)
G06F 11/14   (2006.01)

(52) U.S. Cl.
CPC .......... *G06F 11/3612* (2013.01); *G06F 8/60* (2013.01); *G06F 9/5072* (2013.01); *G06F 11/1464* (2013.01)

(58) Field of Classification Search
CPC ...... G06F 11/3612; G06F 8/60; G06F 9/5072; G06F 11/1464
See application file for complete search history.

(56) References Cited

U.S. PATENT DOCUMENTS

| | | | |
|---|---|---|---|
| 2004/0158766 A1* | 8/2004 | Liccione | H04L 41/0654 714/4.11 |
| 2007/0071223 A1* | 3/2007 | Lee | H04M 3/48 379/265.02 |
| 2013/0031529 A1* | 1/2013 | Bernelas | G06F 8/31 717/114 |
| 2013/0047036 A1* | 2/2013 | Pechanec | G06F 11/3672 714/38.1 |
| 2014/0173554 A1* | 6/2014 | Gupta | G06F 8/38 717/106 |
| 2014/0372533 A1* | 12/2014 | Fu | G06F 9/5072 709/204 |
| 2022/0138604 A1* | 5/2022 | Mehra | G06F 11/3476 706/46 |

\* cited by examiner

*Primary Examiner* — Hang Pan
(74) *Attorney, Agent, or Firm* — GREENBLUM & BERNSTEIN, P.L.C.

(57) ABSTRACT

Various methods, apparatuses/systems, and media for automating deployment and configuration of contact centers are disclosed. A processor implements a cloud agnostic model-driven architecture, the architecture including at least a design-time environment and a run-time environment with corresponding combination of tools configured for delivery, development, and management of applications throughout systems; creates a cloud agnostic model configured to be executed on a plurality of cloud environments runtimes for an on-demand execution; on-boards and validates the cloud agnostic model in the design-time environment; tests, in response to a positive validation, the cloud agnostic model in the design-time environment; publishes, in response to a positive test, the cloud agnostic model on the run-time environment; activates the cloud agnostic model on the run-time environment; and creates, in response to activation, a multi-cloud contact center.

17 Claims, 10 Drawing Sheets

SYSTEM AND METHOD FOR MODEL-DRIVEN MULTI-CLOUD CONTACT CENTER

TECHNICAL FIELD

This disclosure generally relates to cloud contact center, and, more particularly, to methods and apparatuses for implementing a cloud agnostic model-driven architecture that automates the deployment and configuration of contact centers.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Typically, businesses may pursue a multi-cloud strategy for their cloud contact center needs. Multi-cloud may refer to an ecosystem of cloud service providers that may be utilized for seamless integration of different components of a target architecture. Having a healthy ecosystem of partners that offer multiple options and enables an enterprise to act as a true consumer of best-in-breed cloud services in the market may prove to be essential for running an enterprise. However, today's multi-cloud solutions introduce various complexities due to the diversity of vendor implementations, build practices, and interfaces. For example, conventional contact centers fail to provide resiliency to withstand operational outages due to disaster outages or epidemic outbreaks. Moreover, conventional contact center solutions have been historically inflexible and slow to change. Currently, it may not be possible to offer advanced contact center services on demand, and any introduction of new capabilities may result in complex, slow, and costly redesigns. Thus, there is a need for an advanced tool that can mitigate the shortcomings of these conventional tools.

SUMMARY

The present disclosure, through one or more of its various aspects, embodiments, and/or specific features or sub-components, provides, among other features, various systems, servers, devices, methods, media, programs, and platforms for implementing a cloud agnostic model-driven architecture that automates the deployment and configuration of contact centers, thereby enabling creation of and changing deployment models in an agile manner, as business needs change, and pushing them to multiple cloud runtimes environments for on-demand executions, introducing business agility and CI/CD (continuous integration/continuous deployment) practices for cloud contact centers; ensuring business continuity in the face of outages by configuring the cloud contact centers to be utilized as a backup solution for existing on-premises implementations; eliminating or mitigating the risks associated with human misconfigurations and security vulnerabilities by configuring model-driven designs that are reusable thereby facilitating automation with DevOps tool chains (a set or a combination of tools that aid in the delivery, development, and management of software applications throughout the systems), etc., but the disclosure is not limited thereto.

According to an aspect of the present disclosure, a method for automating deployment and configuration of contact centers by utilizing one or more processors and one or more memories is disclosed. The method may include: implementing a cloud agnostic model-driven architecture, the architecture including at least a design-time environment and a run-time environment with corresponding combination of tools configured for delivery, development, and management of applications throughout systems; creating a cloud agnostic model configured to be executed on a plurality of cloud environments runtimes for an on-demand execution; onboarding the cloud agnostic model in the design-time environment; validating the cloud agnostic model in the design-time environment; testing, in response to a positive validation, the cloud agnostic model in the design-time environment; publishing, in response to a positive test, the cloud agnostic model on the run-time environment; activating the cloud agnostic model on the run-time environment; and creating, in response to activation, a multi-cloud contact center.

According to yet another aspect of the instant disclosure, each cloud environment having differing vendor implementations, build practices, and interfaces.

According to a further aspect of the instant disclosure, the method may further include creating a unique domain specific declarative language; and describing the multi-cloud contact center in a corresponding declarative syntax.

According to an additional aspect of the instant disclosure, the method may further include creating the multi-cloud contact center at a SaaS (software as a service) level.

According to yet another aspect of the instant disclosure, the method may further include: detecting a datacenter failure; and configuring the multi-cloud contact center in a manner such that the multi-cloud contact center can be utilized as a backup solution for existing on-premises implementations when the datacenter failure is detected.

According to yet another aspect of the instant disclosure, the method may further include: implementing the cloud agnostic model-driven architecture in creating the multi-cloud contact center in a manner such that the multi-cloud contact center is reusable; and integrating the multi-cloud contact center with the corresponding combination of tools configured for executing automatic delivery, development, and management of the applications throughout the systems.

According to a further aspect of the instant disclosure, the cloud agnostic model may be a declarative model that describes queue structures, agent data, routing or selection strategies, and IVR (interactive voice response) flows needed to process inbound customer calls.

According to another aspect of the instant disclosure, a system for automating deployment and configuration of contact centers is disclosed. The system may include: a processor; and a memory operatively connected to the processor via a communication interface, the memory storing computer readable instructions, when executed, may cause the processor to: implement a cloud agnostic model-driven architecture, the architecture including at least a design-time environment and a run-time environment with corresponding combination of tools configured for delivery, development, and management of applications throughout systems; create a cloud agnostic model configured to be executed on a plurality of cloud environments runtimes for an on-demand execution, each cloud environment having differing vendor implementations, build practices, and interfaces; onboard the cloud agnostic model in the design-time environment; validate the cloud agnostic model in the design-time environment; test, in response to a positive validation, the cloud agnostic model in the design-time environment; publish, in response to a positive test, the cloud agnostic model on the run-time environment; activate the cloud agnostic model on the run-time environment; and create, in response to activation, a multi-cloud contact center.

According to a further aspect of the instant disclosure, the processor may be further configured to create a unique domain specific declarative language; and describe the multi-cloud contact center in a corresponding declarative syntax.

According to an additional aspect of the instant disclosure, the processor may be further configured to create the multi-cloud contact center at a SaaS (software as a service) level.

According to yet another aspect of the instant disclosure, the processor may be further configured to: detect a datacenter failure; and configure the multi-cloud contact center in a manner such that the multi-cloud contact center can be utilized as a backup solution for existing on-premises implementations when the datacenter failure is detected.

According to yet another aspect of the instant disclosure, the processor may be further configured to: implement the cloud agnostic model-driven architecture in creating the multi-cloud contact center in a manner such that the multi-cloud contact center is reusable; and integrate the multi-cloud contact center with the corresponding combination of tools configured for executing automatic delivery, development, and management of the applications throughout the systems.

According to a further aspect of the instant disclosure, a non-transitory computer readable medium configured to store instructions for automating deployment and configuration of contact centers is disclosed. The instructions, when executed, may cause a processor to perform the following: implementing a cloud agnostic model-driven architecture, the architecture including at least a design-time environment and a run-time environment with corresponding combination of tools configured for delivery, development, and management of applications throughout systems; creating a cloud agnostic model configured to be executed on a plurality of cloud environments runtimes for an on-demand execution, each cloud environment having differing vendor implementations, build practices, and interfaces; onboarding the cloud agnostic model in the design-time environment; validating the cloud agnostic model in the design-time environment; testing, in response to a positive validation, the cloud agnostic model in the design-time environment; publishing, in response to a positive test, the cloud agnostic model on the run-time environment; activating the cloud agnostic model on the run-time environment; and creating, in response to activation, a multi-cloud contact center.

According yet another aspect of the instant disclosure, the instructions, when executed, may further cause the processor to perform the following: creating a unique domain specific declarative language; and describing the multi-cloud contact center in a corresponding declarative syntax.

According to an additional aspect of the instant disclosure, the instructions, when executed, may further cause the processor to perform the following: creating the multi-cloud contact center at a SaaS (software as a service) level.

According to yet another aspect of the instant disclosure, the instructions, when executed, may further cause the processor to perform the following: detecting a datacenter failure; and configuring the multi-cloud contact center in a manner such that the multi-cloud contact center can be utilized as a backup solution for existing on-premises implementations when the datacenter failure is detected.

According to yet another aspect of the instant disclosure, the instructions, when executed, may further cause the processor to perform the following: implementing the cloud agnostic model-driven architecture in creating the multi-cloud contact center in a manner such that the multi-cloud contact center is reusable; and integrating the multi-cloud contact center with the corresponding combination of tools configured for executing automatic delivery, development, and management of the applications throughout the systems.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
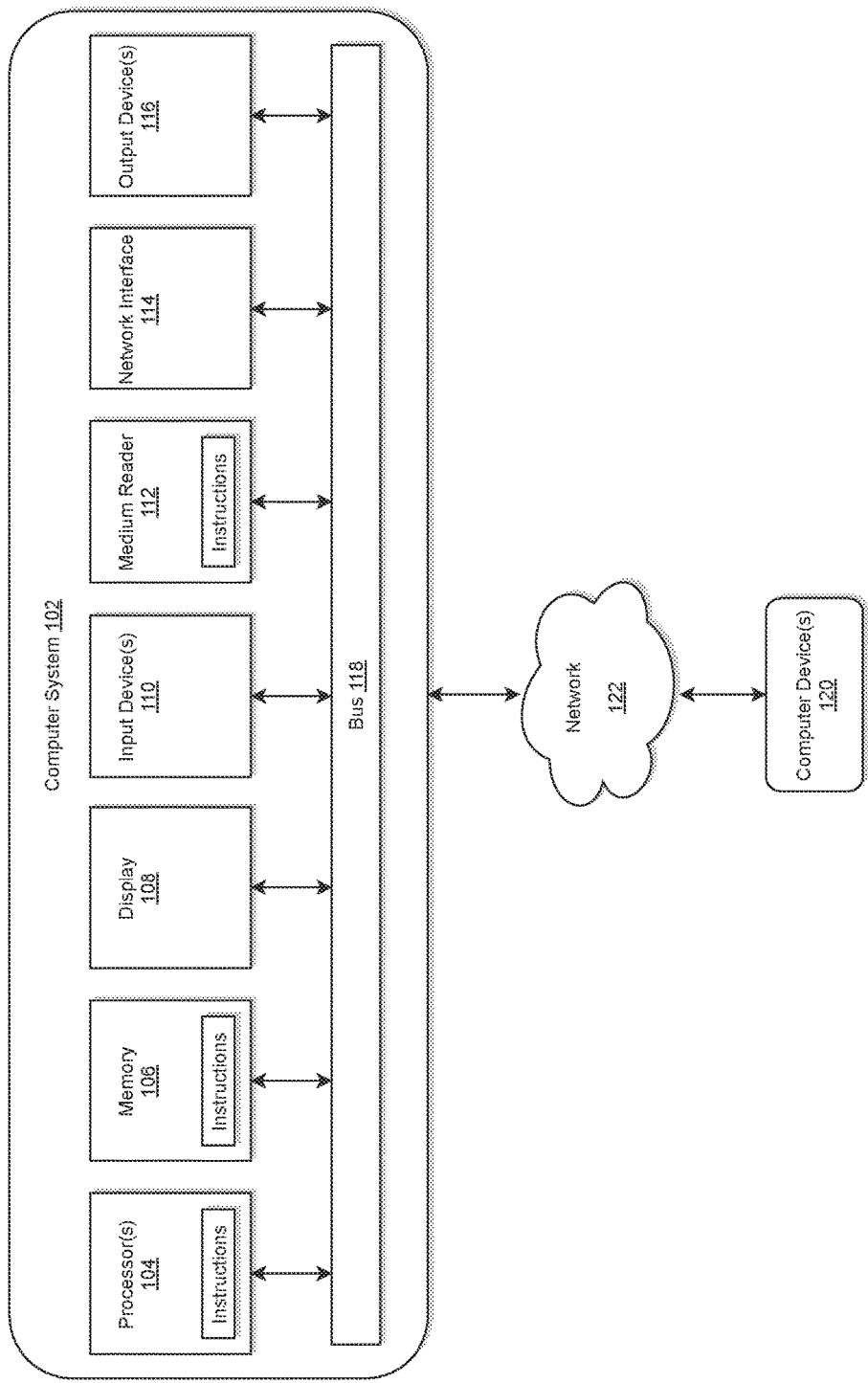
FIG. 1 illustrates a computer system for automating deployment and configuration of contact centers in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for automating deployment and configuration of contact centers in accordance with the embodiments described herein, but the disclosure is not limited thereto. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
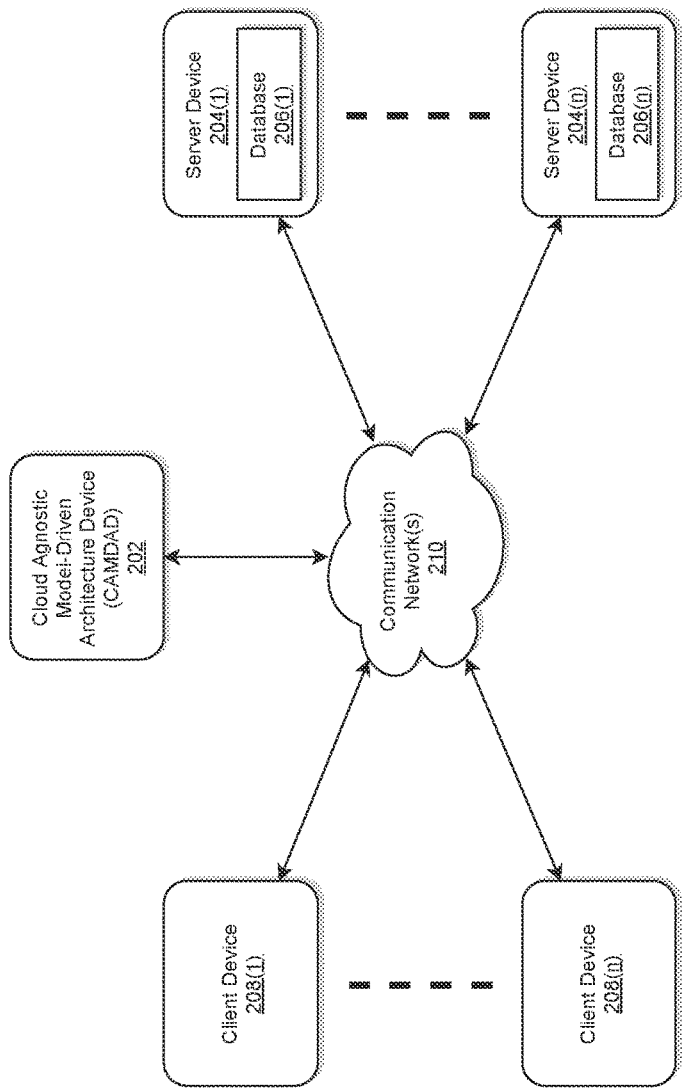
FIG. 2 illustrates an exemplary diagram of a network environment with a cloud agnostic model-driven architecture device in accordance with an exemplary embodiment.

Referring to FIG. 2, a schematic of an exemplary network environment 200 for implementing a cloud agnostic model-driven architecture device (CAMDAD) of the instant disclosure is illustrated.

According to exemplary embodiments, the above-described problems associated with conventional approach of contact centers creation may be overcome by implementing a CAMDAD 202 as illustrated in FIG. 2 that may automate the deployment and configuration of contact centers, thereby enabling creation of and changing deployment models in an agile manner, as business needs change, and pushing them to multiple cloud runtimes environments for on-demand executions, introducing business agility and CI/CD (continuous integration/continuous deployment) practices for cloud contact centers; ensuring business continuity in the face of outages by configuring the cloud contact centers to be utilized as a backup solution for existing on-premises implementations; eliminating or mitigating the risks associated with human misconfigurations and security vulnerabilities by configuring model-driven designs that are reusable thereby facilitating automation with DevOps tool chains (a set or a combination of tools that aid in the delivery, development, and management of software applications throughout the systems), etc., but the disclosure is not limited thereto.

The CAMDAD 202 may be the same or similar to the computer system 102 as described with respect to FIG. 1.

The CAMDAD 202 may store one or more applications that can include executable instructions that, when executed by the CAMDAD 202, cause the CAMDAD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CAMDAD 202 itself, may be located in virtual server(s) running in a cloud-based computing environment rather than being tied to one or more specific physical network computing devices. Also, the application(s) may be running in one or more virtual machines (VMs) executing on the CAMDAD 202. Additionally, in one or more embodiments of this technology, virtual machine(s) running on the CAMDAD 202 may be managed or supervised by a hypervisor.

In the network environment 200 of FIG. 2, the CAMDAD 202 is coupled to a plurality of server devices 204(1)-204(n) that hosts a plurality of databases 206(1)-206(n), and also to a plurality of client devices 208(1)-208(n) via communication network(s) 210. A communication interface of the CAMDAD 202, such as the network interface 114 of the computer system 102 of FIG. 1, operatively couples and communicates between the CAMDAD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CAMDAD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CAMDAD 202 may be a standalone device or integrated with one or more other devices or apparatuses, such as one or more of the server devices 204(1)-204(n), for example. In one particular example, the CAMDAD 202 may be hosted by one of the server devices 204(1)-204(n), and other arrangements are also possible. Moreover, one or more of the devices of the CAMDAD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the CAMDAD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the CAMDAD 202 that may efficiently provide a platform for implementing a cloud agnostic model-driven architecture module that automates the deployment and configuration of contact centers, thereby enabling creation of and changing deployment models in an agile manner, as business needs change, and pushing them to multiple cloud runtimes environments for on-demand executions, introducing business agility and CI/CD (continuous integration/continuous deployment) practices for cloud contact centers; ensuring business continuity in the face of outages by configuring the cloud contact centers to be utilized as a backup solution for existing on-premises implementations; eliminating or mitigating the risks associated with human misconfigurations and security vulnerabilities by configuring model-driven designs that are reusable thereby facilitating automation with DevOps tool chains (a set or a combination of tools that aid in the delivery, development, and management of software applications throughout the systems), etc., but the disclosure is not limited thereto.

The client devices 208(1)-208(n) may run interface applications, such as standard web browsers or standalone client applications, which may provide an interface to communicate with the CAMDAD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the CAMDAD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CAMDAD 202, the server devices 204(1)-204(n), or the client devices 208(1)-208(n), for example, may be configured to operate as virtual instances on the same physical machine. For example, one or more of the CAMDAD 202, the server devices 204(1)-204(n), or the client devices 208(1)-208(n) may operate on the same physical device rather than as separate devices communicating through communication network(s) 210. Additionally, there may be more or fewer CAMDADs 202, server devices 204(1)-204(n), or client devices 208(1)-208(n) than illustrated in FIG. 2. According to exemplary embodiments, the CAMDAD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
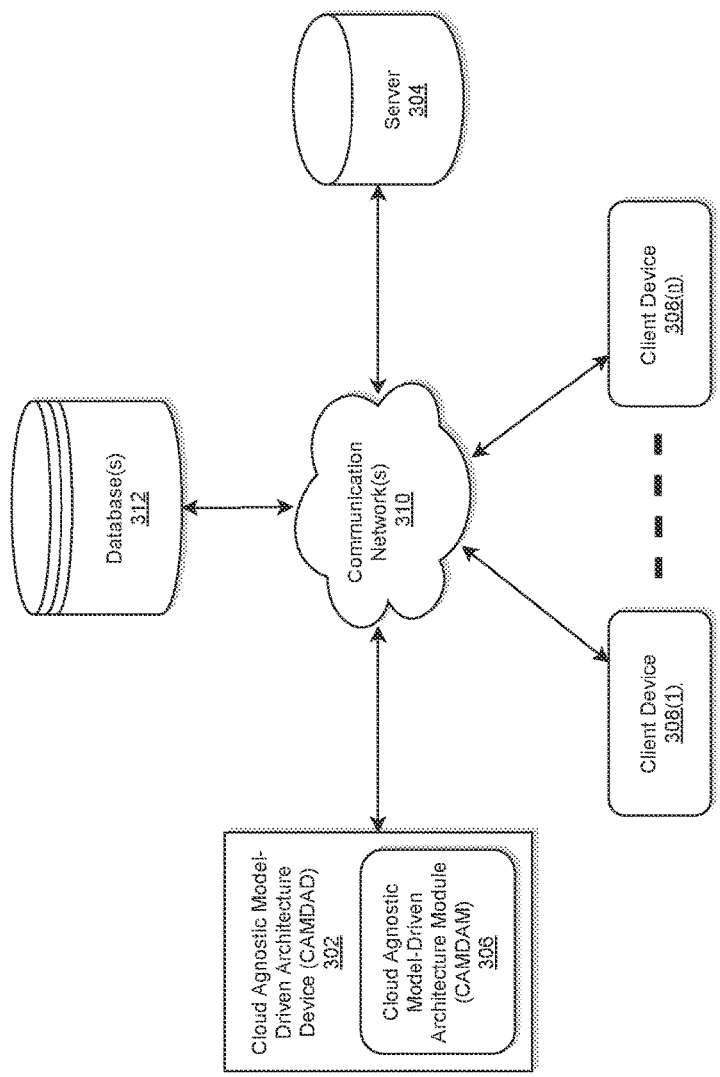
FIG. 3 illustrates a system diagram for implementing a cloud agnostic model-driven architecture device having a cloud agnostic model-driven architecture module in accordance with an exemplary embodiment.

FIG. 3 illustrates a system diagram for implementing a cloud agnostic model-driven architecture device (CAMDAD) having a cloud agnostic model-driven architecture module (CAMDAM) in accordance with an exemplary embodiment.

As illustrated in FIG. 3, the system 300 may include a CAMDAD 302 within which a CAMDAM 306 is embedded, a server 304, a database(s) 312, a plurality of client devices 308(1) . . . 308(n), and a communication network 310. The database(s) 312 may be also referred to as a configuration and log database, knowledge base, backend system of records, enterprise system of records, inventory systems, etc., but the disclosure is not limited thereto.

According to exemplary embodiments, the CAMDAD 302 including the CAMDAM 306 may be connected to the server 304, and the database(s) 312 via the communication network 310. The CAMDAD 302 may also be connected to the plurality of client devices 308(1) . . . 308(n) via the communication network 310, but the disclosure is not limited thereto. The client devices 308(1) . . . 308(n) may be the same or similar to the client devices 208(1) . . . 208(n)

According to exemplary embodiment, the CAMDAD 302 is described and shown in FIG. 3 as including the CAMDAM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein.

According to exemplary embodiments, the CAMDAM 306 may be configured to receive real-time feed of data from the plurality of client devices 308(1) . . . 308(n) via the communication network 310.

As will be described below, the CAMDAM 306 may be configured to implement a cloud agnostic model-driven architecture, the architecture including at least a design-time environment and a run-time environment with corresponding combination of tools configured for delivery, development, and management of applications throughout systems; create a cloud agnostic model configured to be executed on a plurality of cloud environments runtimes for an on-demand execution, each cloud environment having differing vendor implementations, build practices, and interfaces; onboard the cloud agnostic model in the design-time environment; validate the cloud agnostic model in the design-time environment; test, in response to a positive validation, the cloud agnostic model in the design-time environment; publish, in response to a positive test, the cloud agnostic model on the run-time environment; activate the cloud agnostic model on the run-time environment; and create, in response to activation, a multi-cloud contact center, but the disclosure is not limited thereto.

The plurality of client devices 308(1) . . . 308(n) are illustrated as being in communication with the CAMDAD 302. In this regard, the plurality of client devices 308(1) . . . 308(n) may be "clients" of the CAMDAD 302 and are described herein as such. Nevertheless, it is to be known and understood that the plurality of client devices 308(1) . . . 308(n) need not necessarily be "clients" of the CAMDAD 302, or any entity described in association therewith herein. Any additional or alternative relationship may exist between either or both of the plurality of client devices 308(1) . . . 308(n) and the CAMDAD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the CAMDAD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The CAMDAD 302 may be the same or similar to the CAMDAD 202 as described with respect to FIG. 2, including any features or combination of features described with respect thereto.

Figure 4:
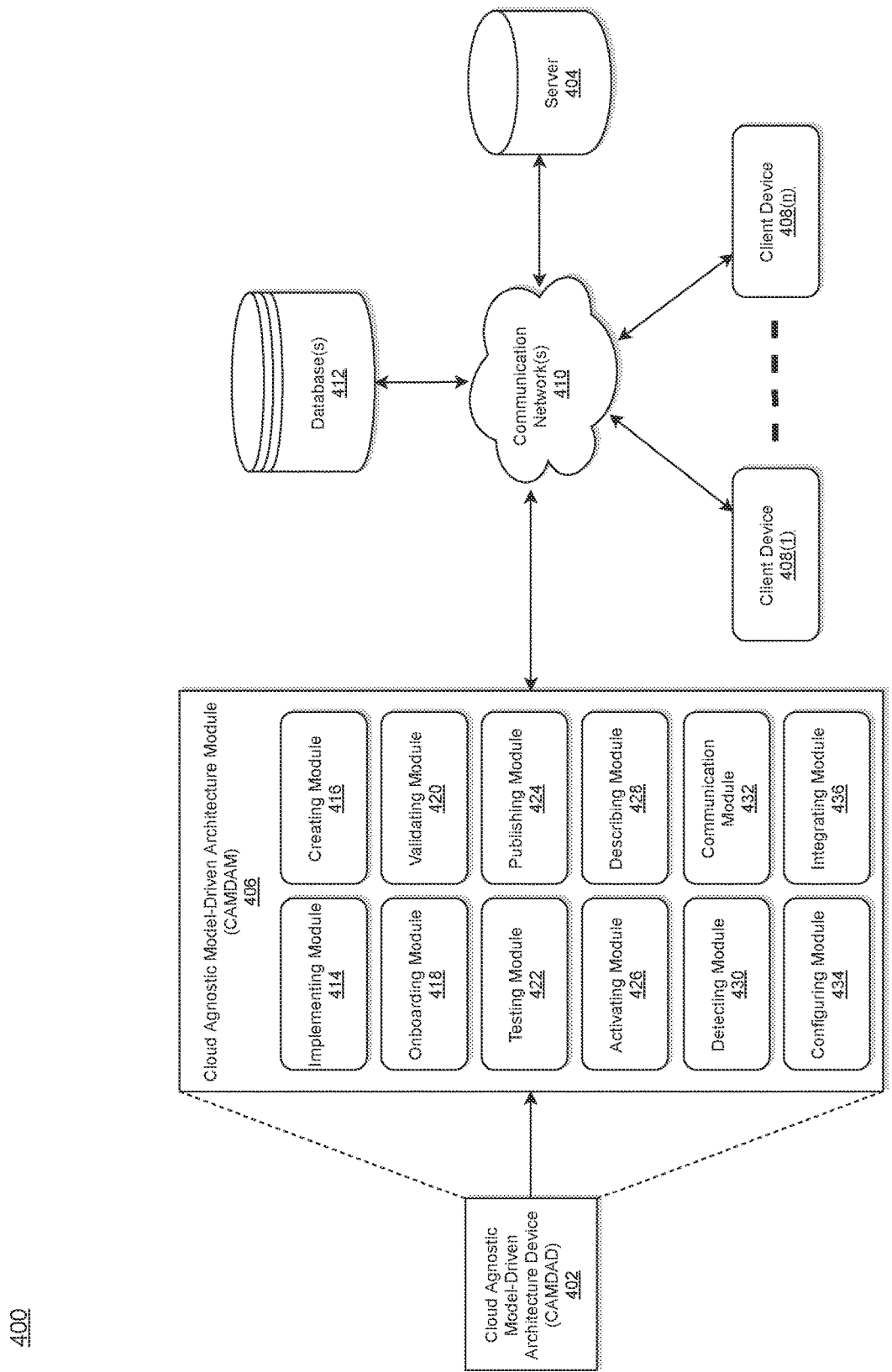
FIG. 4 illustrates a system diagram for implementing a cloud agnostic model-driven architecture module of FIG. 3 in accordance with an exemplary embodiment.

FIG. 4 illustrates a system diagram for implementing a cloud agnostic model-driven architecture module (CAMDAM) of FIG. 3 in accordance with an exemplary embodiment.

According to exemplary embodiments, the system 400 may include a cloud agnostic model-driven architecture device (CAMDAD) 402 within which a CAMDAM 406 is embedded, a server 404, database(s) 412, and a communication network 410.

According to exemplary embodiments, the CAMDAD 402 including the CAMDAM 406 may be connected to the server 404 and the database(s) 412 via the communication network 410. The CAMDAD 402 may also be connected to the plurality of client devices 408(1)-408(n) via the communication network 410, but the disclosure is not limited thereto. The CAMDAM 406, the server 404, the plurality of client devices 408(1)-408(n), the database(s) 412, the communication network 410 as illustrated in FIG. 4 may be the same or similar to the CAMDAM 306, the server 304, the plurality of client devices 308(1)-308(n), the database(s) 312, the communication network 310, respectively, as illustrated in FIG. 3.

According to exemplary embodiments, as illustrated in FIG. 4, the CAMDAM 406 may include an implementing module 414, a creating module 416, an onboarding module 418, a validating module 420, a testing module 422, a publishing module 424, an activating module 426, a describing module 428, a detecting module 430, a communication module 432, a configuring module 434, and an integrating module 436.

According to exemplary embodiments, each of the implementing module 414, creating module 416, onboarding module 418, validating module 420, testing module 422, publishing module 424, activating module 426, describing module 428, detecting module 430, communication module 432, configuring module 434, and the integrating module 436 of the CAMDAM 406 as illustrated in FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the implementing module 414, creating module 416, onboarding module 418, validating module 420, testing module 422, publishing module 424, activating module 426, describing module 428, detecting module 430, communication module 432, configuring module 434, and the integrating module 436 of the CAMDAM 406 as illustrated in FIG. 4 may be implemented by microprocessors or similar, and may be programmed using software (e.g., microcode) to perform various functions discussed herein and may optionally be driven by firmware and/or software.

Alternatively, according to exemplary embodiments, each of the implementing module 414, creating module 416, onboarding module 418, validating module 420, testing module 422, publishing module 424, activating module 426, describing module 428, detecting module 430, communication module 432, configuring module 434, and the integrating module 436 of the CAMDAM 406 as illustrated in FIG. 4 may be implemented by dedicated hardware, or as a combination of dedicated hardware to perform some functions and a processor (e.g., one or more programmed microprocessors and associated circuitry) to perform other functions.

According to exemplary embodiments, each of the implementing module 414, creating module 416, onboarding module 418, validating module 420, testing module 422, publishing module 424, activating module 426, describing module 428, detecting module 430, communication module 432, configuring module 434, and the integrating module 436 of the CAMDAM 406 as illustrated in FIG. 4 may be called via corresponding API.

The process may be executed via the communication module 432 and the communication network 410, which may comprise plural networks as described above. For example, in an exemplary embodiment, the various components of the CAMDAM 406 may communicate with the server 404, and the database(s) 412, 512 via the communication module 432 and the communication network 410. Of course, these embodiments are merely exemplary and are not limiting or exhaustive.

According to exemplary embodiments, the communication network 410 and the communication module 432 may be configured to establish a link between the database(s) 412, 512 the client devices 408(1)-408(n) and the CAMDAM 406 and the HDSM system 504.

Figure 5:
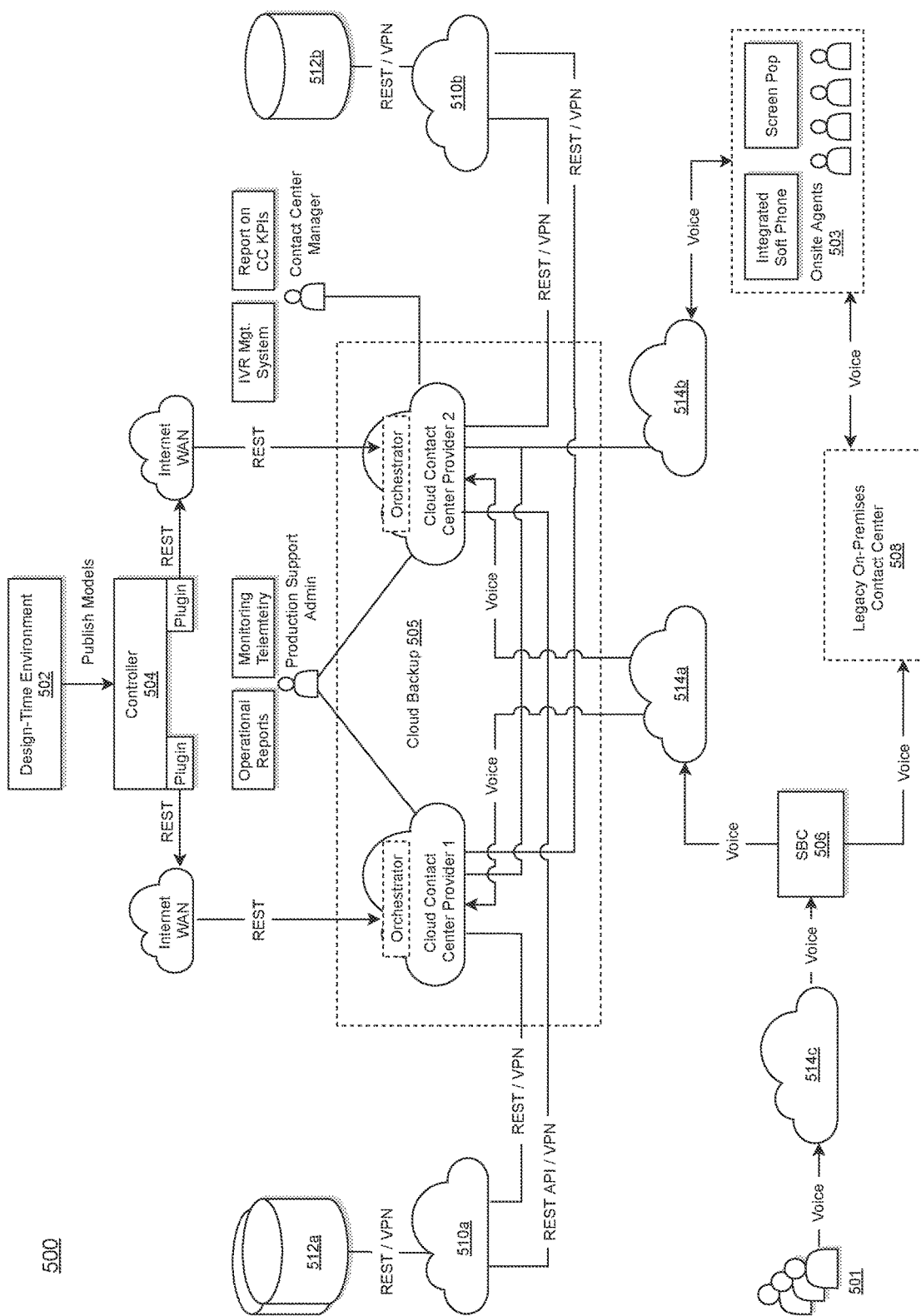
FIG. 5 illustrates an exemplary architecture of a multi-cloud contact center solution implemented by the cloud agnostic model-driven architecture module of FIG. 4 in accordance with an exemplary embodiment.

For example, FIG. 5 illustrates an exemplary architecture 500 of a multi-cloud contact center solution implemented by the CAMDAM 406 of FIG. 4 in accordance with an exemplary embodiment.

As illustrated in FIG. 5, the exemplary architecture 500 shows a high-level architecture of the multi-cloud contact center solution, deployed as a business-continuity/backup (e.g., cloud backup 505) to an existing on-premises contact center implementation (e.g., legacy on-premises contact center 508). The exemplary architecture 500 may include a design-time environment 502 which is operatively connected with a controller 504. The controller 504 is operatively connected with a plurality of cloud contact center provider (e.g., cloud contact center provider 1, cloud contact center provider 2, but the disclosure is not limited thereto).

As illustrated in FIG. 5, according to exemplary embodiments, the cloud center provider 1 may be operatively connected to corresponding internet/WAN 510a which may be operatively connected to backend system of records 512a. The cloud center provider 1 may also be operatively connected to corresponding internet, VoIP (voice over IP), PSTN 514a. The internet, VoIP (voice over IP), PSTN 514a may be operatively connected to a carrier SBC (session border controller) 506 which may obtain voice data from customers 501 via internet, VoIP, PSTN 514c. The carrier SBC 506 may be operatively connected to the legacy on-premises contact center 508. The legacy on-premises contact center 508 may be bi-directionally connected to on site agents 503 via integrated softphone or screen POP (picture-on-picture).

As illustrated in FIG. 5, according to exemplary embodiments, the cloud center provider 2 may also be operatively connected to corresponding internet/WAN 510b which may be operatively connected to a knowledge base 512b. The cloud center provider 2 may also be operatively connected to corresponding internet, VoIP (voice over IP), PSTN 514b. The internet, VoIP (voice over IP), PSTN 514b may be bi-directionally connected to the on-site agents 503a via integrated softphone or screen POP (picture-on-picture).

According to exemplary embodiments, the cloud center provider 1 may also be operatively connected to the internet, VoIP (voice over IP), PSTN 514b and the cloud center provider 2 may also be operatively connected to the internet, VoIP (voice over IP), PSTN 514a.

In this example of FIG. 5, when a datacenter failure is detected by the detecting module 430, the carrier SBC 506 may be utilized to fork-off the inbound traffic and route it to the public cloud contact center providers (e.g., to cloud contact center provider 1, cloud contact center provider 2).

According to exemplary embodiments, the above-described solution, as illustrated in FIG. 5 and implemented by the CAMDAM 406, allows separation of design-time environment and runtime environment that support agile DevOps processes for design and creation of contact centers. Such DevOps build processes implemented by the CAM- DAM enable the agility and flexibility in deployment of cloud contact centers, thereby enabling the Contact Center as a Service (CCaaS) model.

Although contact center has been utilized in FIGS. 5, 6A, 6B, 7A, and 7B as illustrated purposes, the disclosure is not limited thereto. For example, the processes implemented by the CAMDAM 406 may be extended to call center and/or engagement center without departing from the scope of the present disclosure.

Figure 6A:
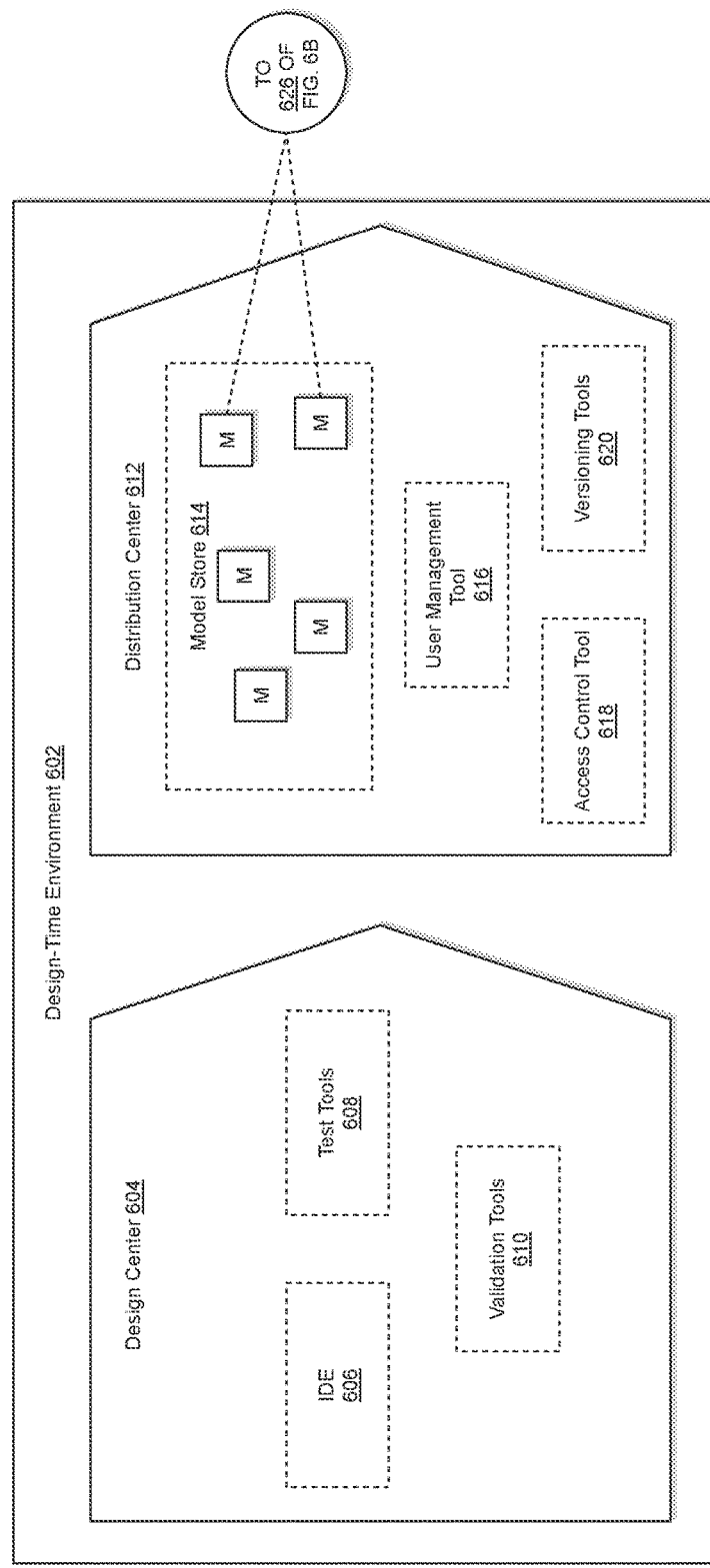
FIG. 6A and FIG. 6B, in combination, illustrates an exemplary multi-cloud architecture with corresponding DevOps tool chain implemented by the cloud agnostic model-driven architecture module of FIG. 4 in accordance with an exemplary embodiment.
Figure 6B:
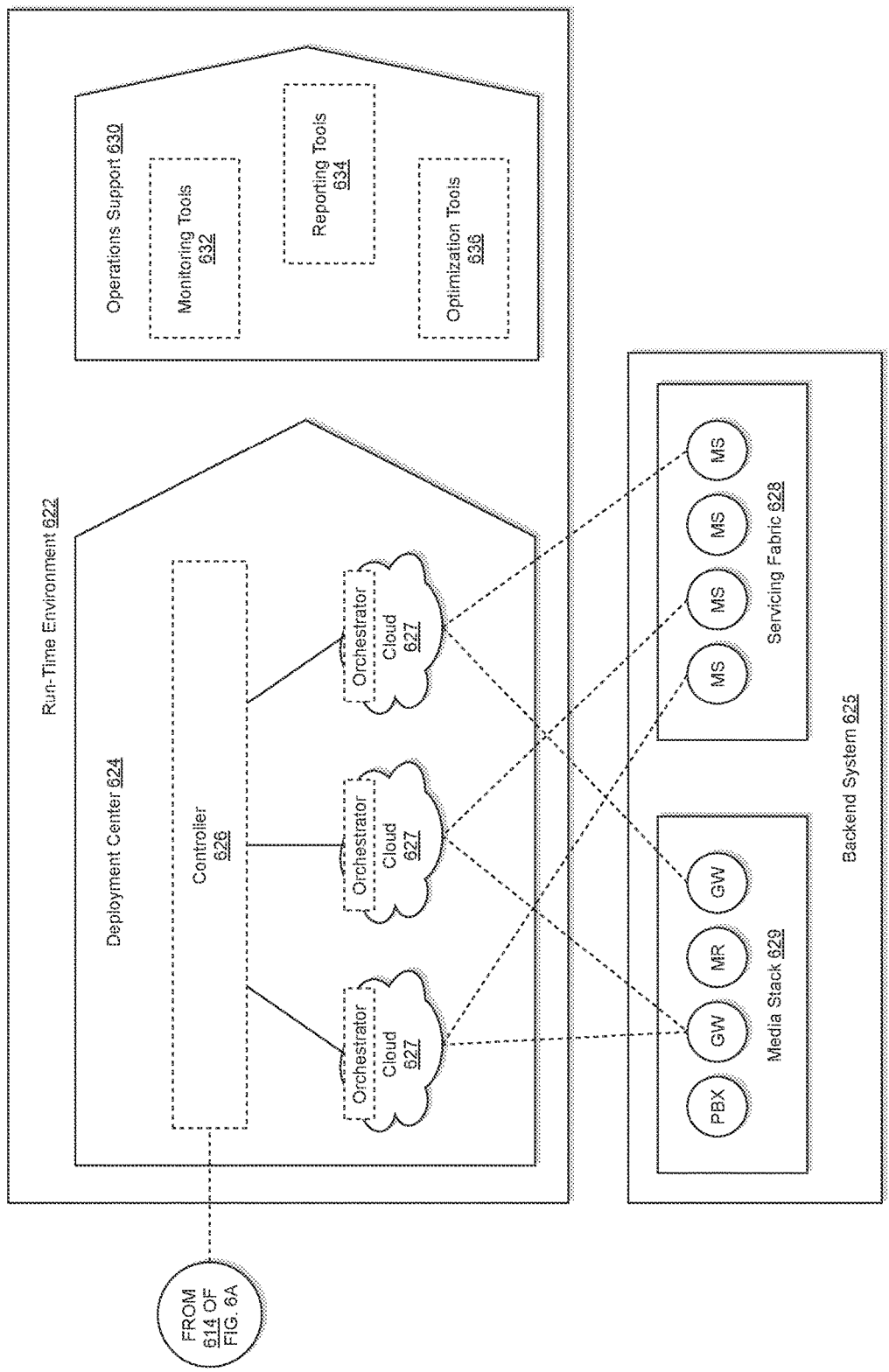
Figure 7A:
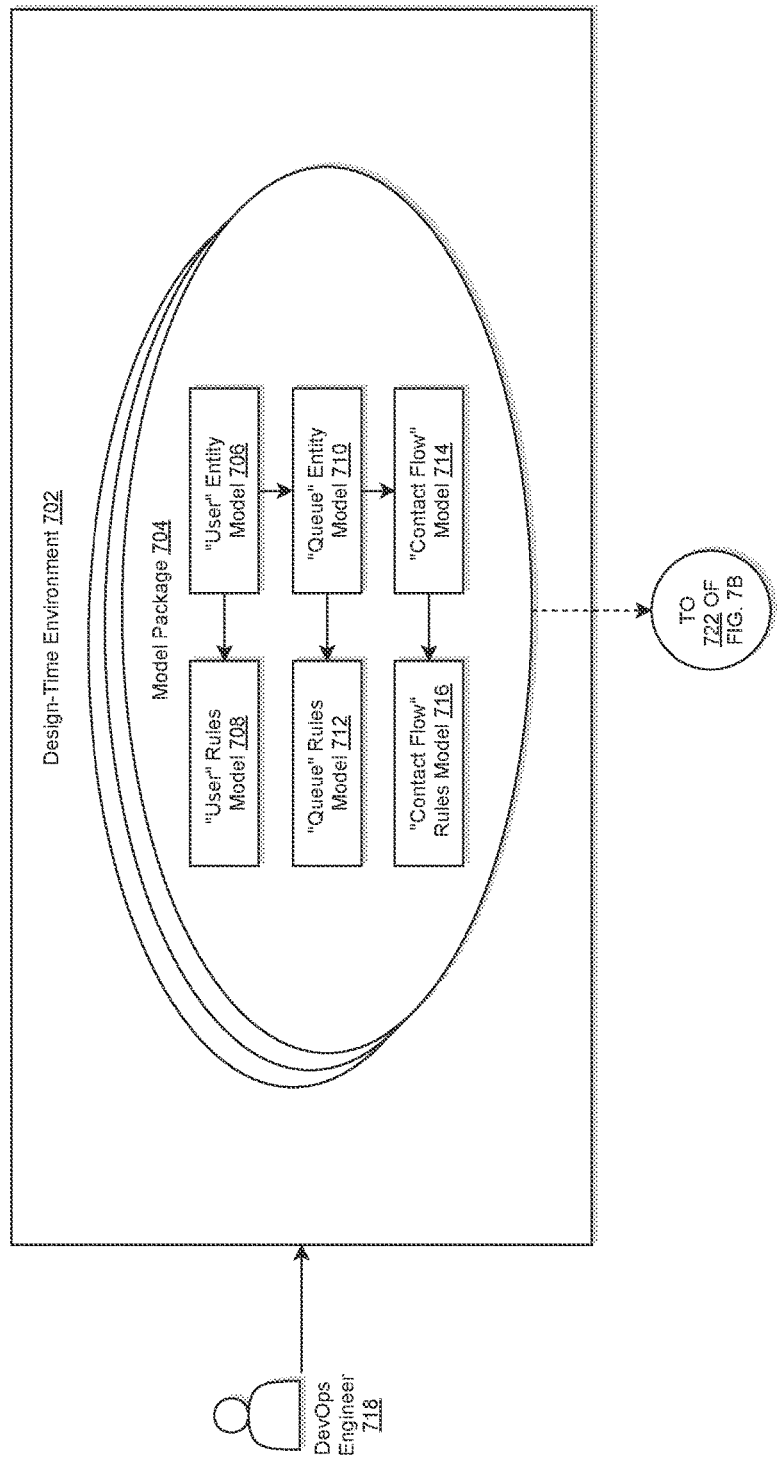
FIG. 7A and FIG. 7B, in combination, illustrates an exemplary multi-cloud controller architecture implemented by the cloud agnostic model-driven architecture module of FIG. 4 in accordance with an exemplary embodiment.
Figure 7B:
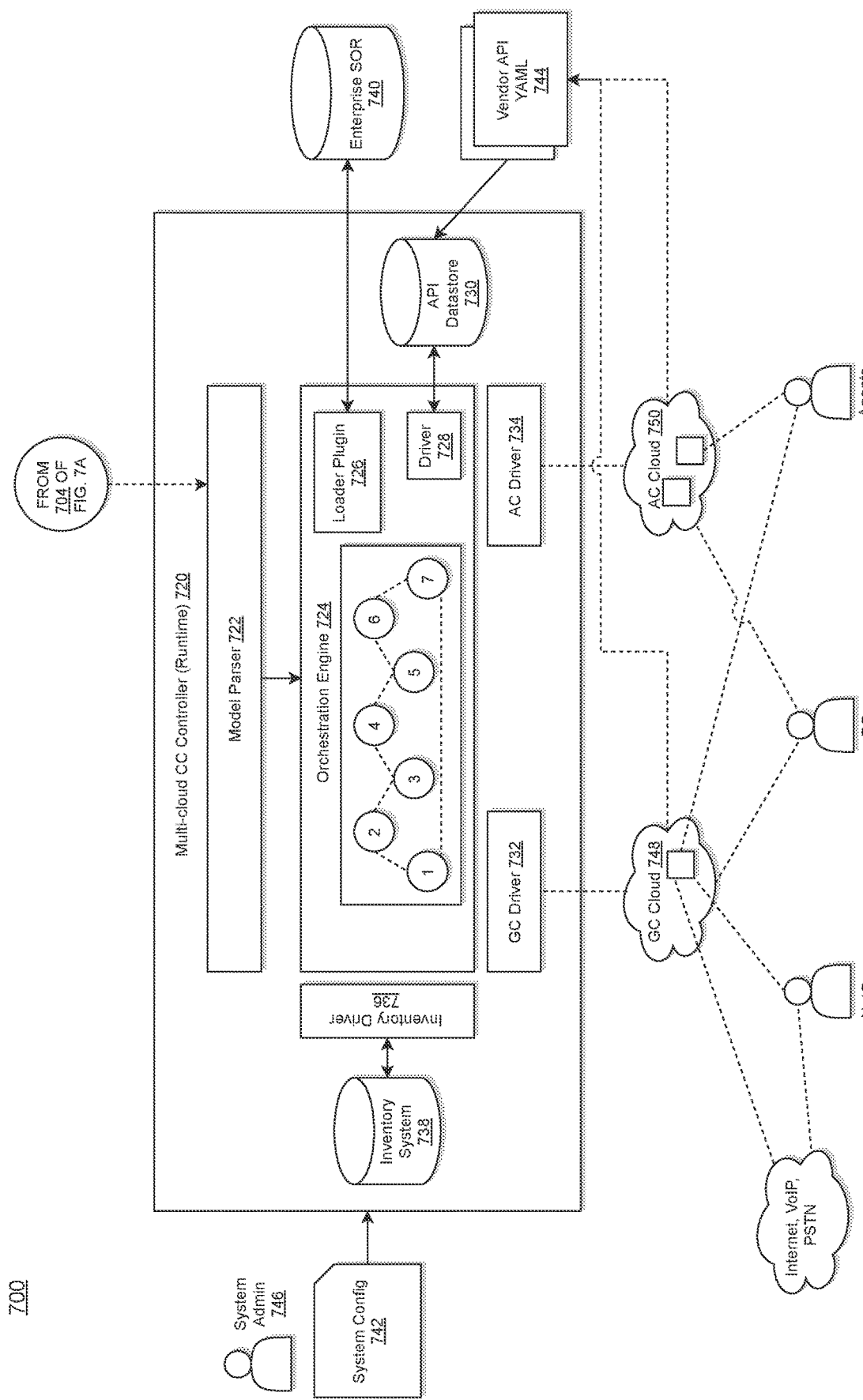

In this architecture 500, declarative models are on-boarded by the onboarding module 418 and tested by the testing module 422 in the design time environment 502, and then published by the publishing module 424 and activated by the activating module 426 on the run-time environment (e.g., 622 as illustrated in FIG. 6B; 720 as illustrated in FIG. 7B). Such declarative models describe the queue structures, the agent data, the routing or selection strategies, and the IVR flows needed to process the inbound customer 501 calls.

According to exemplary embodiments, the multi-cloud deployment is supported by implementing a control layer (e.g., controller 504) that abstracts the API diversities of different cloud service providers (e.g., cloud contact center provider 1, cloud contact center provider 2) and enables model-driven programmability.

According to exemplary embodiments, while the declarative models focus on describing what needs to be built, the multi-cloud controller (e.g., controller 504) configured to execute building it on multiple cloud runtime environments (e.g., 622 as illustrated in FIG. 6B; 720 as illustrated in FIG. 7B). The architecture 500 supports on-demand deployment of contact center capabilities. The cloud contact centers are pre-configured and activated on-demand in case of failure. Some of the key capabilities of this architecture 500 may include, but are not limited thereto: no infrastructure ownership; agile operational models with on-demand provisioning of CCaaS; support multi-cloud deployments to avoid vendor lock-in and speed up innovation; rapid adaption and release of new functionalities; intent-driven deployment (declarative programmability and control is in the hands of the business); automated lifecycle (create, operate, monitor, scale, recover, remove); high reliability, redundancy, and end-to-end scalability (both infrastructure scalability and agent scalability), etc., but the disclosure is not limited thereto.

Referring back to FIGS. 4 and 5, according to exemplary embodiments, the implementing module 414 may be configured to implement the cloud agnostic model-driven architecture 500 in creating the multi-cloud contact center (i.e., cloud backup 505) in a manner such that the multi-cloud contact center is reusable. The integrating module 436 may be configured to integrate the multi-cloud contact center (i.e., cloud backup 505) with the corresponding combination of tools configured for executing automatic delivery, development, and management of the applications throughout the systems.

FIG. 6A and FIG. 6B, in combination, illustrates an exemplary multi-cloud architecture 600 with corresponding DevOps tool chain implemented by the CAMDAM 406 of FIG. 4 in accordance with an exemplary embodiment.

As illustrated in FIG. 6A, the architecture 600 may include a design-time environment 602 that may include a design center 604 and a distribution center 612. The design center 604, according to exemplary embodiments, may include IDE (integrated development environment) for models 606, testing tools 608 for testing the models, and validation tools 610 for validating the models. The distribution center 612, according to exemplary embodiments, may include model store 614, user management tool 616, access control 618, and versioning tools 620. The model store 614 may be operatively connected to controller 626 of FIG. 6B.

As illustrated in FIG. 6B, the architecture 600 may include a run-time environment 622 and a backend system 625. The backend system 625, according to exemplary embodiments may include a media stack 629 and a servicing fabric 628, but the disclosure is not limited thereto. The run-time environment 622, according to exemplary embodiments, may include a deployment center 624 and operations support 630. The deployment center 624 may include the controller 626 that is operatively connected to the model store 614, and a plurality of clouds 627 each operatively connected to a media stack 629 and servicing fabric 628, but the disclosure is not limited thereto. The operations support 630, according to exemplary embodiments, may include monitoring tools 632, reporting tools 634, and optimization tools 636, but the disclosure is not limited thereto.

According to exemplary embodiments, FIGS. 6A and 6B, in combination, illustrates the DevOps pipeline for a multi-cloud target architecture 600. As illustrated in FIGS. 6A and 6B, this architecture 600 implemented by the CAMDAM 406 is configured by a design-time environment 602 and a runtime environment 622, together with the required DevOps tool chains. Thus, the DevOps pipeline as illustrated in FIGS. 6A and 6B is configured for providing agility and flexibility in deployment, thereby enabling the on-demand provisioning of CCaaS. The ability to treat contact center creation like code and use CI/CD tools allows the IT organization to rapidly deploy contact centers in response to changing business needs.

According to exemplary embodiments, the purpose of the design-time environment 602 is to create, validate and test declarative deployment and configuration artifacts that (e.g., cloud agnostic model), indicating the use of one unified model for multiple cloud environments. Such models use declarative syntax to describe 'what' needs to be deployed rather than focusing on 'how' to implement it. For example, the declarative models describe the desired target configuration state that the runtime has to implement by running specific commands in a well-defined order.

According to exemplary embodiments, the DevOps tool chain used in the design-time and runtime environments, as implemented by the CAMDAM 406, reduces the complexity and brings visibility to the state and configuration of cloud contact centers. According to exemplary embodiments, automation and collaboration that is introduced through the DevOps tool chain, as implemented by the CAMDAM 406, removes the error-prone aspect of manual processes, manual misconfiguration, and makes build processes more consistent, agile and productive.

As illustrated in FIG. 6A, the design center 604 contains a set of tools that support the creation, validation, and testing of model documents. For example, the IDE 606 may be utilized to create models in the design-time environment 602. The validation tools 610 may be utilized to validate the models created by the IDE 606 in the design-time environment 602 and the testing tools 608 may be utilized to test the models validated by the validation tools 610.

According to exemplary embodiments, these models may be declarative models as described above with respect to FIGS. 4 and 5. As described above, these declarative models may be on-boarded, created, augmented, and tested in the design time environment 602.

According to exemplary embodiments, the design center 604 may enable DevOps teams to test applications in production-like environments early in the development cycle. Once tested, the models may be published in the distribution center 612. The model store 614 in the distribution center 612 may act as a repository for published models and supports functions such as versioning by utilizing the versioning tools 620, user management by utilizing the user management tool 616, and access control by utilizing the access control tool 618.

As illustrated in FIG. 6B, the deployment center 624 in the run-time environment 622 may interface with multiple cloud providers 627 through a unified controller (e.g., controller 626). The controller 626 abstracts the different cloud service provider environments through a unified northbound interface. The controller 626 imports the models (e.g., cloud agnostic models) from the model store 614 and compiles them into deployment files so that each cloud provider 627 can execute. Once deployment files are executed, the desired contact center function is brought up and activated on the public cloud runtime environments. Examples are model-driven creation of contact flows, queue structures, user groups, and skills, but the disclosure is not limited thereto. The runtime clouds can dynamically provision and tear down environments based on model definitions.

In the target architecture 600, as illustrated in FIGS. 6A and 6B, the designers make changes to the service description and version the configuration models. Once published, the release pipeline executes the model to configure target environments. If designers need to make changes to the contact center, they edit and test the source document, not the target environment. For example, models configure the runtime through machine-readable documents, rather than interactive configuration tools. Furthermore, the DevOps pipeline as implemented by the CAMDAM 406 delivers stable, consistent, and repeatable environments rapidly and at scale.

FIG. 7A and FIG. 7B, in combination, illustrates an exemplary multi-cloud contact center controller architecture 700 implemented by the CAMDAM 406 of FIG. 4 in accordance with an exemplary embodiment.

As illustrated in FIG. 7A, the exemplary multi-cloud contact center controller architecture 700 may include a design-time environment 702, and as illustrated in FIG. 7B, the exemplary multi-cloud contact center controller architecture 700 may include a run-time environment, e.g., multi-cloud contact center controller (runtime) 720. Model package 704, including user entity model 706, user rules model 708, queue entity model 710, queue rules model 712, contact flow model 714, contact flow rules model 716, etc., may be created within the design-time environment 702 by receiving inputs from DevOps engineer 718.

As illustrated in FIG. 7B, the multi-cloud contact center controller (runtime) 720 may include a model parser 722 that is operatively connected to an orchestration engine (rules engine) 724. The orchestration engine 724 may include a loader plugin 726 that is bi-directionally connected with an enterprise system of record (SOR) 740 to obtain data from the enterprise SOR 740. The orchestration engine 724 also include a driver 728 that is bi-directionally connected to an API datastore 730. The datastore 730 stores vendor API YAML 744, but the disclosure is not limited thereto. For example, vendor API can be of any other programming language without departing from the scope of the present disclosure.

According to exemplary embodiments, the multi-cloud contact center controller (runtime) 720 may also include an inventory system 738 bi-directionally connected with an inventory driver 736; a GC driver 732 operatively connected with GC cloud environment 748; and an AC driver 734 operatively connected to an AC cloud environment 750. Data received form the GC cloud environment 748 and AC cloud environment 750 may be utilized to create vendor API YAML 744.

According to exemplary embodiments, a system configuration file 742 may be inputted by a system administrator 746 to the multi-cloud contact center controller (runtime) 720.

As illustrated in FIG. 7B, the model package 704 are fed to a model parser 722 which translates them into a usable data structure for the orchestration engine (rules engine) 724 to process. The orchestration engine (rules engine) 724, according to exemplary embodiments, may serve as an interpreter for the input models (e.g., model package 704), directly following the rules and objects outlined by a user, and execute them. Instance data are loaded from the outside SORs (e.g., enterprise SOR 740) via the custom loader plugin 726 and passed into the data structure that the model parser 722 produces.

According to exemplary embodiments, a primary objective of the orchestration engine (rules engine) 724 may be to construct the individual bodies for the API requests that is needed to make the configurations in each respective cloud run-time environment. The previously-defined rules models (see, e.g., FIG. 7A) direct the multi-cloud contact center controller (runtime) 720 to achieve this by utilizing the object models (see, e.g., FIG. 7A). The contact center inventory system 738 is configured to keep records for all instances of contact centers. The constructed-API bodies are passed to the individual cloud drivers (e.g., GC driver 732; AC driver 734), which perform a few additional operations before ultimately pushing the configurations to each respective cloud environment (e.g., GC cloud 748; AC cloud 750) by obtaining corresponding data from internet, VoIP, PSTN, network operators, agents, and PO.

Referring back to FIGS. 4, 5, 6A, 6B, 7A, and 7B, according to exemplary embodiments, the implementing module 414 may be configured to implement a cloud agnostic model-driven architecture, the architecture including at least a design-time environment (e.g., 602 as illustrated in FIG. 6A; 702 as illustrated in FIG. 7A) and a run-time environment (e.g., 622 as illustrated in FIG. 6B; 720 as illustrated in FIG. 7B) with corresponding combination of tools configured for delivery, development, and management of applications throughout systems (see, e.g., FIGS. 5, 6A, 6B, 7A, and 7B).

According to exemplary embodiments, the creating module 416 may be configured to create a cloud agnostic model (e.g., model package 704 including user entity model 706, user rules model 708, queue entity model 710, queue rules model 712, contact flow model 714, contact flow rules model 716, etc., as illustrated in FIG. 7A, but the disclosure is not limited thereto) configured to be executed on a plurality of cloud environments runtimes (e.g., 622 as illustrated in FIG. 6B; 720 as illustrated in FIG. 7B) for an on-demand execution, each cloud environment having differing vendor implementations, build practices, and interfaces.

According to exemplary embodiments, the onboarding module 418 may be configured to onboard the cloud agnostic model (e.g., model package 704 including user entity model 706, user rules model 708, queue entity model 710, queue rules model 712, contact flow model 714, contact flow rules model 716, etc., as illustrated in FIG. 7A, but the disclosure is not limited thereto) in the design-time environment (e.g., 602 as illustrated in FIG. 6A; 702 as illustrated in FIG. 7A).

According to exemplary embodiments, the validating module 420 may be configured to validate the cloud agnostic model (e.g., model package 704 including user entity model 706, user rules model 708, queue entity model 710, queue rules model 712, contact flow model 714, contact flow rules model 716, etc., as illustrated in FIG. 7A, but the disclosure is not limited thereto) in the design-time environment (e.g., 602 as illustrated in FIG. 6A; 702 as illustrated in FIG. 7A).

According to exemplary embodiments, the testing module 422 may be configured to test, in response to a positive validation, the cloud agnostic model (e.g., model package 704 including user entity model 706, user rules model 708, queue entity model 710, queue rules model 712, contact flow model 714, contact flow rules model 716, etc., as illustrated in FIG. 7A, but the disclosure is not limited thereto) in the design-time environment (e.g., 602 as illustrated in FIG. 6A; 702 as illustrated in FIG. 7A).

According to exemplary embodiments, the publishing module 424 may be configured to publish, in response to a positive test, the cloud agnostic model (e.g., model package 704 including user entity model 706, user rules model 708, queue entity model 710, queue rules model 712, contact flow model 714, contact flow rules model 716, etc., as illustrated in FIG. 7A, but the disclosure is not limited thereto) on the run-time environment (e.g., 622 as illustrated in FIG. 6B; 720 as illustrated in FIG. 7B).

According to exemplary embodiments, the activating module 426 may be configured to activate the cloud agnostic model (e.g., model package 704 including user entity model 706, user rules model 708, queue entity model 710, queue rules model 712, contact flow model 714, contact flow rules model 716, etc., as illustrated in FIG. 7A, but the disclosure is not limited thereto) on the run-time environment (e.g., 622 as illustrated in FIG. 6B; 720 as illustrated in FIG. 7B).

According to exemplary embodiments, the creating module 416 may be further configured to create, in response to activation, a multi-cloud contact center.

According to exemplary embodiments, the creating module 416 may be further configured to create a unique domain specific declarative language; and the describing module 428 may be configured to describe the multi-cloud contact center in a corresponding declarative syntax.

According to exemplary embodiments, the creating module 416 may be further configured to create the multi-cloud contact center at a SaaS (software as a service) level.

According to exemplary embodiments, the detecting module 430 may be configured to may be further configured to detect a datacenter failure; and the configuring module 434 may be configured to configure the multi-cloud contact center in a manner such that the multi-cloud contact center can be utilized as a backup solution (e.g., FIG. 5) for existing on-premises implementations when the datacenter failure is detected.

Figure 8:
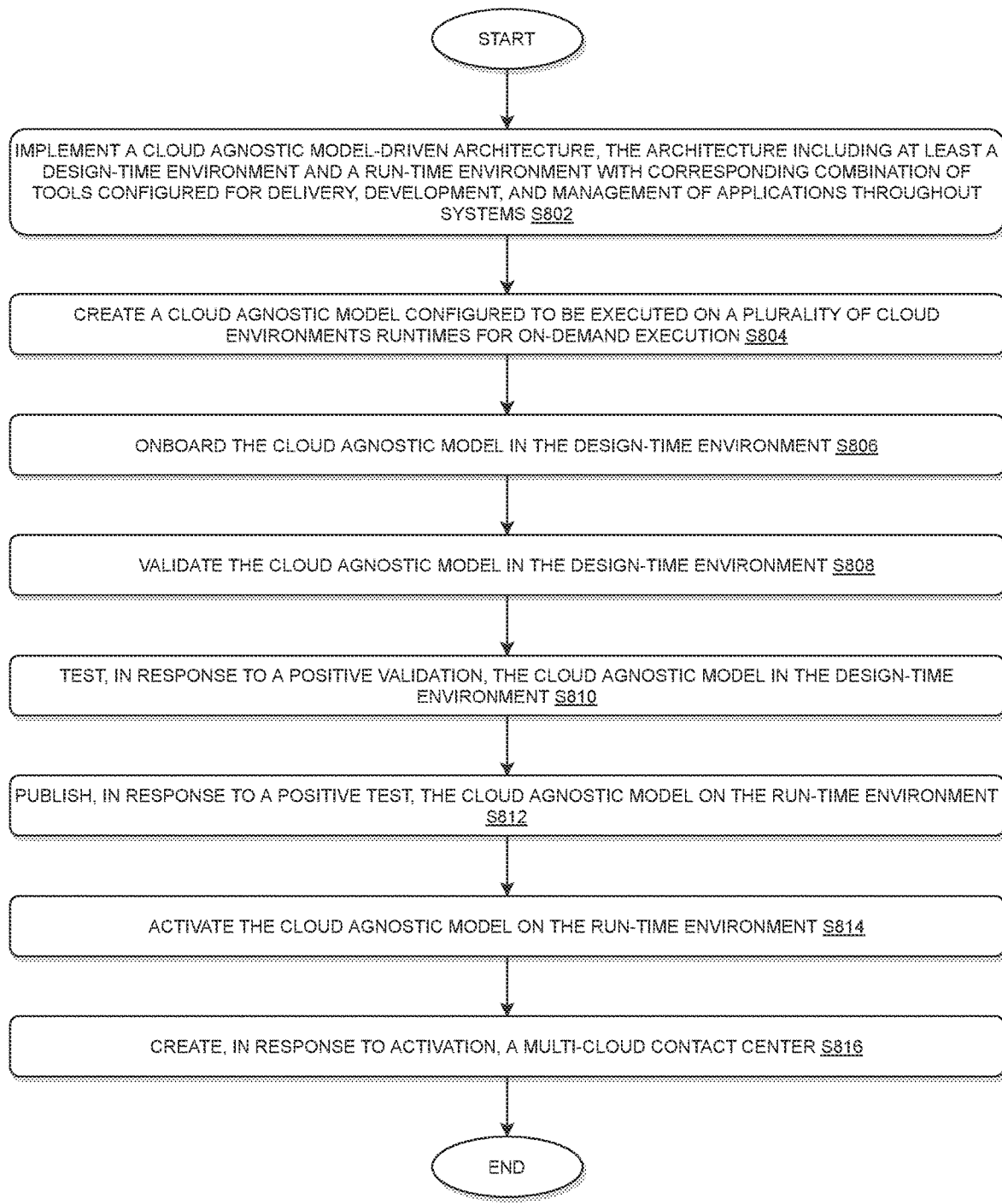
FIG. 8 illustrates a flow chart for automating deployment and configuration of contact centers implemented by the cloud agnostic model-driven architecture module of FIG. 4 in accordance with an exemplary embodiment.

FIG. 8 illustrates a flow chart of a process 800 for automating deployment and configuration of contact centers implemented by the CAMDAM 406 in accordance with an exemplary embodiment. It will be appreciated that the illustrated process 800 and associated steps may be performed in a different order, with illustrated steps omitted, with additional steps added, or with a combination of reordered, combined, omitted, or additional steps.

As illustrated in FIG. 8, at step S802, the process 800 may include implementing a cloud agnostic model-driven architecture, the architecture including at least a design-time environment and a run-time environment with corresponding combination of tools configured for delivery, development, and management of applications throughout systems.

At step S804, the process 800 may include creating a cloud agnostic model configured to be executed on a plurality of cloud environments runtimes for an on-demand execution, wherein each cloud environment having differing vendor implementations, build practices, and interfaces, and wherein the cloud agnostic model may be a declarative model that describes queue structures, agent data, routing or selection strategies, and IVR (interactive voice response) flows needed to process inbound customer calls.

At step S806, the process 800 may include onboarding the cloud agnostic model in the design-time environment.

At step S808, the process 800 may include validating the cloud agnostic model in the design-time environment.

At step S810, the process 800 may include testing, in response to a positive validation, the cloud agnostic model in the design-time environment.

At step S812, the process 800 may include publishing, in response to a positive test, the cloud agnostic model on the run-time environment.

At step S814, the process 800 may include activating the cloud agnostic model on the run-time environment.

At step S816, the process 800 may include creating, in response to activation, a multi-cloud contact center.

According to exemplary embodiments, the process 800 may further include creating a unique domain specific declarative language; and describing the multi-cloud contact center in a corresponding declarative syntax.

According to exemplary embodiments, the process 800 may further include: creating the multi-cloud contact center at a SaaS (software as a service) level.

According to exemplary embodiments, the process 800 may further include: detecting a datacenter failure; and configuring the multi-cloud contact center in a manner such that the multi-cloud contact center can be utilized as a backup solution for existing on-premises implementations when the datacenter failure is detected.

According to exemplary embodiments, the process 800 may further include: implementing the cloud agnostic model-driven architecture in creating the multi-cloud contact center in a manner such that the multi-cloud contact center is reusable; and integrating the multi-cloud contact center with the corresponding combination of tools configured for executing automatic delivery, development, and management of the applications throughout the systems.

According to exemplary embodiments, the CAMDAD 402 may include a memory (e.g., a memory 106 as illustrated in FIG. 1) which may be a non-transitory computer readable medium that may be configured to store instructions for automating deployment and configuration of contact centers as disclosed herein. The CAMDAD 402 may also include a medium reader (e.g., a medium reader 112 as illustrated in FIG. 1) which may be configured to read any one or more sets of instructions, e.g., software, from any of the memories described herein. The instructions, when executed by a processor embedded within the CAMDAM 406, or within the CAMDAD 402, may be used to perform one or more of the methods and processes as described herein. In a particular embodiment, the instructions may reside completely, or at least partially, within the memory 106, the medium reader 112, and/or the processor 104 (see FIG. 1) during execution by the CAMDAD 402.

According to exemplary embodiments, the instructions, when executed, may cause a processor embedded within the CAMDAM 406, or the CAMDAD 402 to perform the following: implementing a cloud agnostic model-driven architecture, the architecture including at least a design-time environment and a run-time environment with corresponding combination of tools configured for delivery, development, and management of applications throughout systems; creating a cloud agnostic model configured to be executed on a plurality of cloud environments runtimes for an on-demand execution, each cloud environment having differing vendor implementations, build practices, and interfaces; onboarding the cloud agnostic model in the design-time environment, and the cloud agnostic model may be a declarative model that describes queue structures, agent data, routing or selection strategies, and IVR (interactive voice response) flows needed to process inbound customer calls; validating the cloud agnostic model in the design-time environment; testing, in response to a positive validation, the cloud agnostic model in the design-time environment; publishing, in response to a positive test, the cloud agnostic model on the run-time environment; activating the cloud agnostic model on the run-time environment; and creating, in response to activation, a multi-cloud contact center. The processor may be the same or similar to the processor 104 as illustrated in FIG. 1 or the processor embedded within CAMDAD 202, CAMDAD 302, CAMDAD 402, and CAMDAM 406.

According to exemplary embodiments, the instructions, when executed, may further cause the processor 104 to perform the following: creating a unique domain specific declarative language; and describing the multi-cloud contact center in a corresponding declarative syntax.

According to exemplary embodiments, the instructions, when executed, may further cause the processor 104 to perform the following: creating the multi-cloud contact center at a SaaS (software as a service) level.

According to exemplary embodiments, the instructions, when executed, may further cause the processor 104 to perform the following: detecting a datacenter failure; and configuring the multi-cloud contact center in a manner such that the multi-cloud contact center can be utilized as a backup solution for existing on-premises implementations when the datacenter failure is detected.

According to exemplary embodiments, the instructions, when executed, may further cause the processor 104 to perform the following: implementing the cloud agnostic model-driven architecture in creating the multi-cloud contact center in a manner such that the multi-cloud contact center is reusable; and integrating the multi-cloud contact center with the corresponding combination of tools configured for executing automatic delivery, development, and management of the applications throughout the systems.

According to exemplary embodiments as disclosed above in FIGS. 1-6, technical improvements effected by the instant disclosure may include a platform for implementing a cloud agnostic model-driven architecture that automates the deployment and configuration of contact centers, thereby enabling creation of and changing deployment models in an agile manner, as business needs change, and pushing them to multiple cloud runtimes environments for on-demand executions, introducing business agility and CI/CD (continuous integration/continuous deployment) practices for cloud contact centers; ensuring business continuity in the face of outages by configuring the cloud contact centers to be utilized as a backup solution for existing on-premises implementations; eliminating or mitigating the risks associated with human misconfigurations and security vulnerabilities by configuring model-driven designs that are reusable thereby facilitating automation with DevOps tool chains (a set or a combination of tools that aid in the delivery, development, and management of software applications throughout the systems), etc., but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automating deployment and configuration of contact centers by utilizing one or more processors and one or more memories, the method comprising:
   implementing a cloud agnostic model-driven architecture, the architecture including at least a design-time environment and a run-time environment with corresponding combination of tools configured for delivery, development, and management of applications throughout systems;
   creating a cloud agnostic model configured to be executed on a plurality of cloud environments runtimes for an on-demand execution;
   on-boarding the cloud agnostic model in the design-time environment;
   validating the cloud agnostic model in the design-time environment;
   testing, in response to a positive validation, the cloud agnostic model in the design-time environment;
   publishing, in response to a positive test, the cloud agnostic model on the run-time environment;
   activating the cloud agnostic model on the run-time environment;
   creating, in response to activation, a multi-cloud contact center at a software as a service (SaaS) level, wherein the multi-cloud contact center is a contact center that is compatible with a plurality of cloud service providers;
   creating a unique domain specific declarative language;
   describing the multi-cloud contact center in a corresponding declarative syntax, wherein the corresponding declarative syntax describes at least one target requirement rather than at least one means for achieving an objective, and wherein the cloud agnostic model comprises a declarative model that is based on the unique domain specific declarative language;
   utilizing a distribution center storage to store the multi-cloud contact center;
   importing the multi-cloud contact center from the distribution center storage;
   compiling the multi-cloud contact center into a deployment file; and
   activating the multi-cloud contact center by executing the deployment file in the run-time environment.

2. The method according to claim 1, wherein each cloud environment having differing vendor implementations, build practices, and interfaces.

3. The method according to claim 1, further comprising:
   detecting a datacenter failure; and
   configuring the multi-cloud contact center in a manner such that the multi-cloud contact center can be utilized as a backup solution for existing on-premises implementations when the datacenter failure is detected.

4. The method according to claim 1, further comprising:
   implementing the cloud agnostic model-driven architecture in creating the multi-cloud contact center in a manner such that the multi-cloud contact center is reusable; and
   integrating the multi-cloud contact center with the corresponding combination of tools configured for executing automatic delivery, development, and management of the applications throughout the systems.

5. The method according to claim 1, wherein the cloud agnostic model is a declarative model that describes queue structures, agent data, routing or selection strategies, and IVR (interactive voice response) flows needed to process inbound customer calls.

6. The method according to claim 1, wherein the cloud agnostic model is published on the run-time environment by a control layer that abstracts API diversities of different cloud service providers.

7. A system for automating deployment and configuration of contact centers, the system comprising:
   a processor; and
   a memory operatively connected to the processor via a communication interface, the memory storing computer readable instructions, when executed, causes the processor to:
   implement a cloud agnostic model-driven architecture, the architecture including at least a design-time environment and a run-time environment with corresponding combination of tools configured for delivery, development, and management of applications throughout systems;
create a cloud agnostic model configured to be executed on a plurality of cloud environments runtimes for an on-demand execution;
on-board the cloud agnostic model in the design-time environment;
validate the cloud agnostic model in the design-time environment;
test, in response to a positive validation, the cloud agnostic model in the design-time environment;
publish, in response to a positive test, the cloud agnostic model on the run-time environment;
activate the cloud agnostic model on the run-time environment;
create, in response to activation, a multi-cloud contact center at a software as a service (SaaS) level, wherein the multi-cloud contact center is a contact center that is compatible with a plurality of cloud service providers;
create a unique domain specific declarative language;
describe the multi-cloud contact center in a corresponding declarative syntax, wherein the corresponding declarative syntax describes at least one target requirement rather than at least one means for achieving an objective, and wherein the cloud agnostic model comprises a declarative model that is based on the unique domain specific declarative language;
utilize a distribution center storage to store the multi-cloud contact center;
import the multi-cloud contact center from the distribution center storage;
compile the multi-cloud contact center into a deployment file; and
activate the multi-cloud contact center by executing the deployment file in the run-time environment.

8. The system according to claim 7, wherein each cloud environment having differing vendor implementations, build practices, and interfaces.

9. The system according to claim 7, wherein the processor is further configured to:
detect a datacenter failure; and
configure the multi-cloud contact center in a manner such that the multi-cloud contact center can be utilized as a backup solution for existing on-premises implementations when the datacenter failure is detected.

10. The system according to claim 7, wherein the processor is further configured to:
implement the cloud agnostic model-driven architecture in creating the multi-cloud contact center in a manner such that the multi-cloud contact center is reusable; and
integrate the multi-cloud contact center with the corresponding combination of tools configured for executing automatic delivery, development, and management of the applications throughout the systems.

11. The system according to claim 7, wherein the cloud agnostic model is a declarative model that describes queue structures, agent data, routing or select ion strategies, and IVR (interactive voice response) flows needed to process inbound customer calls.

12. The system according to claim 7, wherein the cloud agnostic model is published on the run-time environment by a control layer that abstracts API diversities of different cloud service providers.

13. A non-transitory computer readable medium configured to store instructions for automating deployment and configuration of contact centers, wherein, when executed, the instructions cause a processor to:
implement a cloud agnostic model-driven architecture, the architecture including at least a design-time environment and a run-time environment with corresponding combination of tools configured for delivery, development, and management of applications throughout systems;
create a cloud agnostic model configured to be executed on a plurality of cloud environments runtimes for an on-demand execution;
on-board the cloud agnostic model in the design-time environment;
validate the cloud agnostic model in the design-time environment;
test, in response to a positive validation, the cloud agnostic model in the design-time environment;
publish, in response to a positive test, the cloud agnostic model on the run-time environment;
activate the cloud agnostic model on the run-time environment;
create, in response to activation, a multi-cloud contact center at a SaaS (software as a service) level, wherein the multi-cloud contact center is a contact center that is compatible with a plurality of cloud service providers;
create a unique domain specific declarative language;
describe the multi-cloud contact center in a corresponding declarative syntax, wherein the corresponding declarative syntax describes at least one target requirement rather than at least one means for achieving an objective, and wherein the cloud agnostic model comprises a declarative model that is based on the unique domain specific declarative language;
utilize a distribution center storage to store the multi-cloud contact center;
import the multi-cloud contact center from the distribution center storage;
compile the multi-cloud contact center into a deployment file; and
activate the multi-cloud contact center by executing the deployment file in the run-time environment.

14. The non-transitory computer readable medium according to claim 13, wherein each cloud environment having differing vendor implementations, build practices, and interfaces, and wherein the cloud agnostic model is a declarative model that describes queue structures, agent data, routing or selection strategies, and IVR (interactive voice response) flows needed to process inbound customer calls.

15. The non-transitory computer readable medium according to claim 13, wherein, the instructions, when executed, further cause the processor to perform the following:
detecting a datacenter failure; and
configuring the multi-cloud contact center in a manner such that the multi-cloud contact center can be utilized as a backup solution for existing on-premises implementations when the datacenter failure is detected.

16. The non-transitory computer readable medium according to claim 13, wherein the instructions, when executed, further cause the processor to perform the following:
implementing the cloud agnostic model-driven architecture in creating the multi-cloud contact center in a manner such that the multi-cloud contact center is reusable; and integrating the multi-cloud contact center with the corresponding combination of tools configured for executing automatic delivery, development, and management of the applications throughout the systems.

17. The non-transitory computer readable medium according to claim 13, wherein the cloud agnostic model is published on the run-time environment by a control layer that abstracts API diversities of different cloud service providers.

* * * * *